(12) United States Patent
Pramod et al.

(10) Patent No.: US 9,806,656 B1
(45) Date of Patent: Oct. 31, 2017

(54) FAULT TOLERANT PHASE CURRENT MEASUREMENT FOR MOTOR CONTROL SYSTEMS

(71) Applicant: STEERING SOLUTIONS IP HOLDING CORPORATION, Saginaw, MI (US)

(72) Inventors: Prerit Pramod, Saginaw, MI (US); Nayeem Mahmud, Saginaw, MI (US); Rakesh Mitra, Saginaw, MI (US); Dennis B. Skellenger, Saginaw, MI (US); Julie A. Kleinau, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/365,090

(22) Filed: Nov. 30, 2016

(51) Int. Cl.
*H02H 7/08* (2006.01)
*H02P 23/14* (2006.01)

(52) U.S. Cl.
CPC .......... *H02P 23/14* (2013.01); *H02P 2205/01* (2013.01)

(58) Field of Classification Search
CPC .......... H02P 21/22; H02P 21/14; H02P 21/00; H02P 21/50; H02P 29/028; H02P 6/28
USPC ............ 318/400.01, 400.02, 400.04, 400.15, 318/400.21, 563, 638, 650, 71
See application file for complete search history.

(56) References Cited

U.S. PATENT DOCUMENTS

| 6,211,634 | B1 * | 4/2001 | Heller | H02P 6/00 318/400.02 |
| 7,187,153 | B2 * | 3/2007 | Imagawa | B62D 5/046 318/560 |
| 7,791,293 | B2 * | 9/2010 | Nagase | B62D 5/0487 318/400.01 |
| 8,471,507 | B2 * | 6/2013 | Akaishi | H02P 21/06 318/400.04 |
| 8,564,232 | B2 * | 10/2013 | Sato | H02P 6/12 318/400.04 |

* cited by examiner

*Primary Examiner* — Bentsu Ro
*Assistant Examiner* — Thai Dinh
(74) *Attorney, Agent, or Firm* — Cantor Colburn LLP

(57) ABSTRACT

An embodiment of a system for determining a sensor failure in a motor control system with at least three phase current measurements includes a magnitude computation module that determines a magnitude of a diagnostic voltage, the diagnostic voltage represented in a stator frame and based on a difference between an input voltage command and a final voltage command, and a phase evaluation module that determines a phase value of the diagnostic voltage based on the diagnostic voltage. The system also includes a sensor failure identification module that identifies a current sensor failure based on the phase value of the diagnostic voltage, the sensor failure represented by a failure signal, and a current calculation transition module that modifies a calculation scheme for determining a measurement of motor current based on the sensor failure.

18 Claims, 4 Drawing Sheets

FAULT TOLERANT PHASE CURRENT MEASUREMENT FOR MOTOR CONTROL SYSTEMS

BACKGROUND OF THE INVENTION

Electric Power Steering (EPS) systems typically use an electric motor and a method of torque control to provide steering assist. When using a Permanent Magnet Synchronous Motor (PMSM), a method called Field Oriented Control (FOC) may be utilized, which allows alternating current (AC) phase motor voltage and current signals in a stationary reference frame to be transformed into a synchronously rotating reference frame, commonly referred to as a d/q axis reference frame, where the motor voltages and currents become direct current (DC) quantities. FOC torque control is commonly implemented through a closed loop current control method that employs high performance current regulators that minimize the error between commanded and measured currents to achieve near-perfect current tracking. Thus, current control requires the motor currents to be measured, which is typically achieved by measuring the phase currents of the electric machine, which are then transformed into the synchronous frame via a Park Transform, for example, to perform the control in the synchronous reference frame.

When a large offset error occurs in a phase current measurement, the closed loop current control operating in the synchronous reference frame adjusts the motor voltage so that the measurement of motor current matches the command. However, since the measurement is incorrect, the actual motor currents are incorrect. The failure mode results in motor position dependent motor torque and current errors, which may be perceived as a large torque ripple at the motor shaft, and potentially larger than rated motor currents (for the hardware design). When the torque ripple caused by the phase current measurement offset error becomes large enough, it can produce motor torque in the opposite direction from the motor torque command. When used in EPS systems, failures which produce torque in a direction opposite to the desired motor torque command result in increased efforts required by an operator.

Since the sum of all three phase currents must always be equal to zero, most motor control systems typically only employ two shunts for measuring the currents. In many offset error detection schemes used in systems with two phase current measurements, a goal was to detect the presence of an offset error, since it was irrelevant which specific shunt had failed. Due to varying system requirements, three shunt measurement systems are also now being widely employed. In such systems, if an offset error occurs on only a single phase, it is possible to continue running the system in feedback control mode using current regulators with the remaining two accurate measurements, and thereby, improving the fault tolerance and reliability of the overall drive system.

SUMMARY OF THE INVENTION

An embodiment of a system for determining a sensor failure in a motor control system with at least three phase current measurements includes a magnitude computation module that determines a magnitude of a diagnostic voltage, the diagnostic voltage represented in a stator frame and based on a difference between an input voltage command and a final voltage command, and a phase evaluation module that determines a phase value of the diagnostic voltage based on the diagnostic voltage. The system also includes a sensor failure identification module that identifies a current sensor failure based on the phase value of the diagnostic voltage, the sensor failure represented by a failure signal, and a current calculation transition module that modifies a calculation scheme for determining a measurement of motor current based on the sensor failure.

An embodiment of a method for determining a sensor failure in a motor control system with at least three phase current measurements includes determining a magnitude of a diagnostic voltage by a magnitude computation module, the diagnostic voltage represented in a stator frame and based on a difference between an input voltage command and a final voltage command. The method also includes determining, by a phase evaluation module, a phase value of the diagnostic voltage based on the diagnostic voltage, identifying a sensor failure based on the phase value of the diagnostic voltage by a sensor failure identification module, the sensor failure represented by a failed sensor information signal, and modifying a calculation scheme for determining a measurement of motor current based on the sensor failure.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
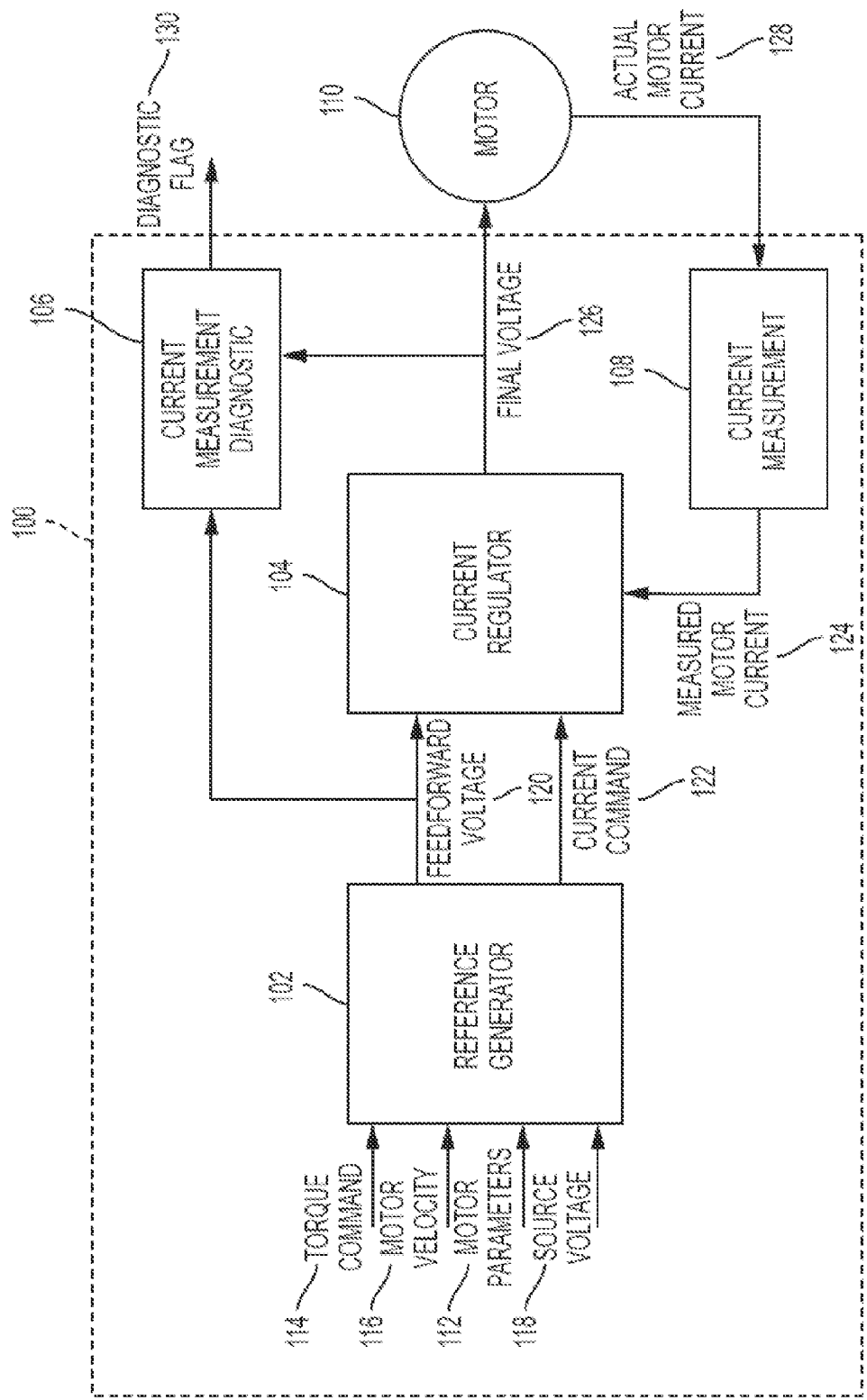
FIG. 1 is an exemplary schematic illustration of a motor control system in accordance with one embodiment.

Referring now to the Figures, where the invention will be described with reference to specific embodiments, without limiting same, FIG. 1 depicts a block diagram of a torque control module 100 of a poly-phase permanent magnet synchronous machine (PMSM), utilizing phase current measurements in a current control feedback loop in accordance with some embodiments of the invention. As shown, the torque control module 100 includes a motor reference current generator 102, a current regulator module 104, and a current measurement diagnostic module 106. FIG. 1 also depicts a feedback current measurement module 108 and a motor 110.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and submodules shown in the Figures may be combined and/or further partitioned.

The motor reference current generator 102 generates a feedforward voltage command 120 and a current command 122 based on input signals. The input signals may include a motor torque command 114, a motor velocity 116, a source voltage signal 118, and motor parameters 112. The motor torque command 114 represents a commanded torque value, and may be derived from another torque control module (not shown) such as an EPS, autonomous steering or semi-autonomous steering control unit, or may correspond to a torque value generated by an operator. The motor velocity 116 is an angular speed of the motor 110 measured by a speed sensor (not shown). The speed sensor may include, for example, an encoder and a speed calculation circuit for calculating the angular speed of a rotor of the motor 110 based on a signal received by the encoder. The source voltage signal 118 represents a bridge voltage from a DC power source (not shown).

The motor parameters 112 are estimated values for the motor 110, including, for example, a motor constant $K_e$ (Volt/rad/s), a motor circuit resistance R (Ohm), a direct axis inductance $L_d$ (Henry) and a quadrature axis inductance $L_q$ (Henry).

In some embodiments, the current command 122 generated by the motor reference current generator 102 includes a reference d-axis current command and a reference q-axis current command that are generated based on the motor torque command 114, the source voltage signal 118, and the angular speed. The motor reference current generator 102 also calculates the feedforward voltage command 120, which may include a feedforward d-axis voltage command and a feedforward q-axis voltage command. The current command 122 satisfies the motor torque command 114 and the source voltage signal 118 limit.

The current regulator module 104 determines a final voltage command 126 based on the feedforward voltage command 120, the current command 122, and measured motor currents 124. The measured motor currents 124 include a measured d-axis current and a measured q-axis current, which are transformed from the current measurement signals in the stator reference frame.

The feedforward voltage commands are typically different for different types of current regulator designs. It should be understood that the feedforward voltage terms used for the current measurement offset diagnostic implementation (e.g., the current measurement diagnostic module 106) may be similar or identical to feedforward voltage terms for motor control using pure static feedforward control. Further, the final voltage commands may be the output of the current regulator. However, the actual voltages applied by an inverter to the motor 110, or any other suitable voltages, may also be used instead of a final voltage command if a measurement of those voltages is available.

The current regulator module 104 sends the final voltage command 126 to the motor 110 to control the motor 110. The final voltage command 126 is also sent to the current measurement diagnostic 106. In some embodiments, a polar conversion controller (not shown) receives as inputs the d-axis voltage command and the q-axis voltage command. Based on the inputs, the polar conversion controller determines a voltage command and a phase advance angle. A pulse width modulation (PWM) generation module (not shown) then receives as input signals the voltage command and the phase advance angle from the polar conversion controller. The PWM generation module also receives a motor position or rotor angle value of the motor 110 measured by a motor position sensor (not shown), and generates multi-phase duty cycle values. In some embodiments, the PWM generation module may include an over-modulation space vector PWM unit that generates three respective duty cycle values. The duty cycle values are used to drive gate drive circuits of an inverter (not shown) that energize phases of the motor 110.

For feedback control purposes, the current measurement module 108 generates measured motor currents 124 based on actual currents 128 from the motor 110. In some embodiments, the current measurement module 108 includes current measurement sensors that generate the measured motor currents 124 from the actual currents 128 transmitted to the motor 110. The measured motor currents 124 therefore represent the values of phase currents (e.g. two phase, three phase) measured by the current measurement module 108.

The current measurements with offset errors in the three-phase A/B/C stationary reference frame may be mathematically expressed as:

$$I_{am} = I_a + \Delta I_a$$

$$I_{bm} = I_b + \Delta I_b$$

$$I_{cm} = I_c + \Delta I_c$$

where $I_{am}$, $I_{bm}$ and $I_{cm}$ are the measured currents for each phase, and $I_a$, $I_b$ and $I_c$ are the actual currents for each phase. $\Delta I_a$, $\Delta I_b$ and $\Delta I_c$ are offset errors associated with current measurements for each phase.

In some embodiments, the current measurement module 108 converts measured values of the AC phase currents in the stationary reference frame (also referred to as the stator reference frame) into equivalent measured DC current components, which are a measured d-axis current and a measured q-axis current in the d/q reference frame (rotor reference frame).

In operation, the current measurement module 108 may introduce offset errors in the stationary reference frame. The measured actual currents, including the offset errors in the $\alpha\beta$ frame, which is also the stationary frame and represents the phase currents. The stationary reference frame may be expressed according to the following equations:

$$I_{\alpha m} = I_\alpha + \Delta I_\alpha$$

$$I_{\beta m} = I_\beta + \Delta I_\beta$$

where $I_{\alpha m}$ and $I_{\beta m}$ are the respective measured currents in the stationary reference frame, $I_\alpha$ and $I_\beta$ are the actual currents in the stationary reference frame, $\Delta I_\alpha$ and $\Delta I_\beta$ are the current measurement offset errors expressed in the stationary reference frame, specifically where $$\Delta I_\alpha = \frac{2\Delta I_a - \Delta I_b - \Delta I_c}{3}$$

and $$\Delta I_\beta = \pm \frac{\Delta I_b - \Delta I_c}{\sqrt{3}}.$$

The + and − signs in the $\Delta I_\beta$ term signs are for positive and negative electromechanical polarity systems respectively.

The sign difference may be important for configuring the detection algorithm for the two system configurations. The description herein is provided for a positive electromechanical polarity system, however, the disclosure can be applied for negative systems.

The stationary reference frame may be used to simplify mathematical derivations shown here:

$$\begin{bmatrix} \alpha \\ \beta \\ 0 \end{bmatrix} = \frac{2}{3} \begin{bmatrix} \cos 0 & \cos\left(\frac{2\pi}{3}\right) & \cos\left(-\frac{2\pi}{3}\right) \\ \sin 0 & \sin\left(\frac{2\pi}{3}\right) & \sin\left(-\frac{2\pi}{3}\right) \\ \frac{1}{2} & \frac{1}{2} & \frac{1}{2} \end{bmatrix} \begin{bmatrix} a \\ b \\ c \end{bmatrix}$$

When transformed into the synchronous reference frame, the measured d/q currents become:

$$I_{dm} = I_d + \Delta I_d$$
$$= I_d + \Delta I_0 \cos(\theta - \phi)$$

$$I_{qm} = I_q + \Delta I_q$$
$$= I_q + \Delta I_0 \sin(\theta - \phi)$$

where $\theta$ is a motor angular position, $I_{dm}$ and $I_{qm}$ are the respective measured currents in the d/q reference frame, $\Delta I_d$ and $\Delta I_q$ are the offset errors associated with the measured currents. The magnitude $\Delta I_0$ and phase $\phi$ of the errors terms can be calculated based on the following equations:

$$\Delta I_0 = \sqrt{\Delta I_\alpha^2 + \Delta I_\beta^2}$$
$$= \frac{2}{3}\sqrt{\Delta I_a^2 + \Delta I_b^2 + \Delta I_c^2 - \Delta I_a \Delta I_b - \Delta I_b \Delta I_c - \Delta I_c \Delta I_a}$$

$$\phi = \tan^{-1}\left(\frac{\Delta I_\beta}{\Delta I_\alpha}\right) = \tan^{-1}\left(\sqrt{3}\,\frac{\Delta I_b - \Delta I_c}{2\Delta I_a - \Delta I_b - \Delta I_c}\right).$$

From the error equations, it can be appreciated that if there is an offset error on only one phase at a time, say $\Delta I_e$, the magnitude of the error is, $$\Delta I_0 = \frac{2}{3}\Delta I_e.$$

The phase of the error term carries the information of the specific shunt that has failed, and the value is unique for each shunt. In some embodiments, the values of the phase for a single point failure, i.e., error in only one phase at a time, in the three phases respectively are:

$\phi_a = 0$ $\phi_b = \tan^{-1}(-\sqrt{3}) = -\phi_x$ $\phi_c = \tan^{-1}(\sqrt{3}) = \phi_x$ Since positive and negative errors in any shunt produce the same phase value $\phi_x$, the signature of the offset error in the phase value is unique for each shunt, irrespective of the sign of the error.

To this end, assuming that the high performance current regulators have sufficiently high bandwidth, the measured currents become equal to reference currents $\Delta I_{dqr}$, and the actual currents become distorted. The actual currents can be expressed as:

$$I_{dq} = I_{dqm} - \Delta I_{dq}$$
$$= I_{dqr} - \Delta I_{dq}$$

In order to diagnose the offset error, the difference ($\Delta V_d$, $\Delta V_q$) between the final voltage command ($V_d$, $V_q$) and feedforward voltage commands ($V_{dFF}$, $V_{qFF}$) in the d/q reference frame under the assumption of accurate parameter estimation can be obtained $$\Delta V_d = V_d - V_{dFF}$$
$$= L_d \frac{dI_d}{dt} + RI_d + \omega_e L_q I_q - RI_{dr} - \omega_e L_q I_{qr}$$
$$= L_d \frac{d(I_{dr} - \Delta I_d)}{dt} + R(I_d - I_{dr}) + \omega_e L_q (I_q - I_{qr})$$
$$= -L_d \frac{d(\Delta I_d)}{dt} - R\Delta I_d - \omega_e L_q \Delta I_q$$
$$= -L_d(-\Delta I_0 \omega_e \sin(\theta - \phi)) - R\Delta I_0 \cos(\theta - \phi) - \omega_e L_q \Delta I_0 \sin(\theta - \phi)$$
$$= -\Delta I_0 (R\cos(\theta - \phi) + \omega_e (L_q - L_d)\sin(\theta - \phi))$$

$$\Delta V_q = V_q - V_{qFF}$$
$$= L_q \frac{dI_q}{dt} + RI_q - \omega_e L_d I_d - RI_{qr} + \omega_e L_d I_{dr}$$
$$= L_q \frac{d(I_{qr} - \Delta I_q)}{dt} + R(I_q - I_{qr}) - \omega_e L_d (I_d - I_{dr})$$
$$= -L_q \frac{d(\Delta I_q)}{dt} - R\Delta I_q + \omega_e L_d \Delta I_d$$
$$= -L_q(\Delta I_0 \omega_e \cos(\theta - \phi)) - R\Delta I_0 \sin(\theta - \phi) + L_d \omega_e(\Delta I_0 \cos(\theta - \phi))$$
$$= -\Delta I_0 (R\sin(\theta - \phi) + \omega_e (L_q - L_d)\cos(\theta - \phi))$$

where $I_{dr}$ is a d-axis reference current command, $I_{qr}$ is a q-axis reference current command, and $\omega_e$, R, $L_d$, and $L_q$ are synchronous frequency (electrical motor velocity), the motor resistance, d-axis inductance, q-axis inductance respectively of the machine.

These voltages can be transformed back to the stationary $\alpha\beta$ frame as follows:

$$\Delta V_\alpha = \Delta V_d \cos\theta + \Delta V_q \sin\theta = (-\Delta I_0(R\cos(\theta - \phi) + \omega_e(L_q - L_d)$$
$$\sin(\theta - \phi)))\cos\theta + (-\Delta I_0(R\sin(\theta - \phi) + \omega_e(L_q - L_d)\cos$$
$$(\theta - \phi)))\sin\theta$$
$$= -\Delta I_0(R(\cos(\theta - \phi)\cos\theta + \sin(\theta - \phi)\sin\theta) + \omega_e \Delta L(\sin(\theta - \phi)\cos\theta + \cos(\theta - \phi)\sin\theta))$$
$$= -\Delta I_0 R\cos\phi - \Delta I_0 \omega_e \Delta L \sin(2\theta - \phi)$$

$$\Delta V_\beta = \Delta V_d \sin\theta - \Delta V_q \cos\theta$$
$$= (-\Delta I_0(R\cos(\theta - \phi) + \omega_e(L_q - L_d)\sin(\theta - \phi)))\sin\theta -$$
$$(-\Delta I_0(R\sin(\theta - \phi) + \omega_e(L_q - L_d)\cos(\theta - \phi)))\cos\theta$$
$$= -\Delta I_0(R(\cos(\theta - \phi)\sin\theta - \sin(\theta - \phi)\cos\theta) - \omega_e \Delta L(-\sin(\theta - \phi)\sin\theta + \cos(\theta - \phi)\cos\theta))$$
$$= -\Delta I_0 R\sin\phi - \Delta I_0 \omega_e \Delta L\cos(2\theta - \phi).$$

The saliency based terms are usually small due to the small inductance difference, and also because of the fact that this diagnostic usually operates in the lower velocity range. In some embodiments, the voltage terms may be approximated as:

$$\Delta V_\alpha \approx -\Delta I_0 R \cos \phi$$

$$\Delta V_\beta \approx -\Delta I_0 R \sin \phi$$

It is noted that calculation of voltage differences such as $\Delta V_\alpha$, and/or $\Delta V_\beta$. Is not limited to the above discussion. For example, $\Delta V_\alpha$, and $\Delta V_\beta$ can be calculated using the complete terms of the equations or using another approximation.

Figure 2:
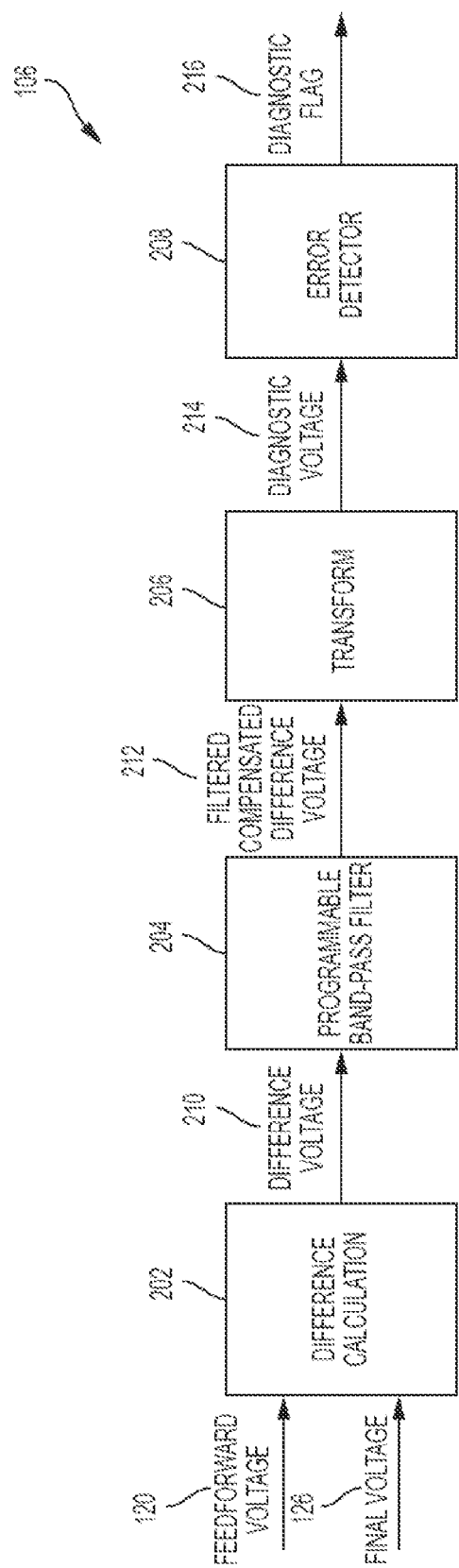
FIG. 2 illustrates a schematic diagram of a phase current measurement diagnostic module in accordance with some embodiments.

FIG. 2 illustrates the current measurement diagnostic module 106 of some embodiments in more detail. As shown, the current measurement diagnostic module 106 includes a difference calculation module 202 for calculating a voltage difference 210 between feedforward and final voltages (e.g., for calculating $\Delta V_d$, $\Delta V_q$, $\Delta V_\alpha$, and/or $\Delta V_\beta$,), a programmable band-pass filter module 204, a transformation module 206, and an error detection module 208.

The programmable band-pass filter module 204 may include a cascaded high-pass and low-pass (gain and phase compensation module) filter structure including a programmable high-pass filter module and low-pass filter module. The band-pass filter module 204 receives the voltage difference 210 between the final voltage command 126 and feedforward voltage command 120. The programmable high-pass filter module results in a removal of constant components from the voltage difference 210. Accordingly, the programmable high-pass filter module may have a cutoff frequency that proportional to a synchronous frequency ω of the motor 110 (FIG. 1). The programmable high pass filter module may be programmed based on a calibratable constant value. The calibratable constant value may be tuned to reduce gain and phase error in the sinusoidal voltage component. A transfer function of the programmable high pass filter module may be written as follows:

$$H(s) = \frac{s}{s + k\omega_e}$$

where k is the calibratable constant, which may be tuned to reduce gain and phase error in the sinusoidal component. The programmable high-pass filter module may utilize the synchronous frequency $\omega_e$ and the gain and phase error introduced by the filter is static. Also, with the programmable high pass filter module, the calibratable constant k may be independently tuned to ensure minimal distortion of the input signal. The programmable high-pass filter module is not limited to the above embodiment. For instance, a higher order filter may be used, so long as the programmable filter removes the constant component of the voltage difference 210.

The high-pass filter module produces a high-pass filtered voltage difference that is sent to the programmable low-pass filter module. The programmable high-pass filter module may introduce magnitude and phase errors to the filtered voltage difference 212, which require a compensation to be performed by the low-pass filter module (also referred to here as a gain and phase compensation module). In some embodiments, the gain and phase compensation module includes a first-order unity gain programmable low-pass filter (PLPF) with the following transfer function:

$$L(s) = \frac{k'\omega_e}{s + k'\omega_e}$$

The first-order unity gain programmable low-pass filter may compensate filtered voltage difference 212 to restore the gain and phase of the final voltage command 126. The compensation may be performed according to constraint equations written as:

$$\angle H(j\omega_e) - \phi L(j\omega_e) = 0$$

$$|H(j\omega_e) L(j\omega_e)| = 1$$

In other embodiments, the gain and phase compensation module may utilize a second order low-pass filter with a transfer function shown below.

$$L(s) = \frac{k'^2 \omega_e^2}{s^2 + 2\zeta k' \omega_e s + k'^2 \omega_e^2}$$

The second order low-pass filter shown above may allow for more specific transient responses by using two tuning parameters k' and ζ. The gain and phase compensation may require different k' and ζ respectively to achieve the steady state specifications, which must be calculated appropriately with the method presented above.

With the cascaded filter structure mentioned above, the programmable band-pass filter module 204 has a transfer function of the form, $$B(s) = H(s)L(s),$$

where:

$$\angle H(j\omega_e) - \phi L(j\omega_e) = 0$$

$$|H(j\omega_e) L(j\omega_e)| = 1$$

The programmable band-pass filter module 204 generates a filtered compensated voltage difference 212 that is sent to a transformation module 206 for processing. Specifically, the transformation module 206 typically utilizes an inverse Park transformation or a similar mathematical transformation to convert the measured phase currents in the DC frame (rotor reference frame, or d/q reference frame) to the AC frame (stator reference frame), simplifying the analysis of the error determination. The output of the transformation module 206 is sent to the error detection module 208 as a diagnostic voltage 214, which is represented in a stator frame. The error detection module 208 determines a magnitude of the diagnostic voltage as compared to a threshold value, for example, in a stator reference frame, and determines whether a current measurement offset error is present, e.g., if the magnitude exceeds the threshold.

The current measurement diagnostic module 106 provides diagnostic robustness for high synchronous frequencies, as well as a full spectrum of synchronous frequencies.

The programmable band-pass filter module 204 may be digitally implemented to mitigate a difference in magnitude and phase of a continuous time filter. The digital implementation of the filter may be based on the synchronous frequency but implemented in a discrete domain, as shown in the following equation, where $\omega_e$ is a synchronous frequency of a motor of the power steering system and $T_s$ is a sampling time of the control loop in which the filter is implemented, $$s = \frac{\omega_e}{\tan\left(\frac{\omega_e T_s}{2}\right)} \frac{1-z^{-1}}{1+z^{-1}},$$

Although in the foregoing example, the band-pass filter module 204 includes a programmable high-pass and a low-pass filter module, it is further contemplated and understood that the filter may be a direct band-pass filter, with imaginary poles for example. The filter may also be designed to be of higher order, a fourth or fifth order filter for example. Further, instead of processing the difference voltage 210, the difference calculation module 202 could be completely eliminated and the final voltage command 126 may be used directly as an input to the band-pass filter module 204 instead of the difference voltage 210.

The main requirement of the current measurement diagnostic module 106 is that it should be able to produce the diagnostic voltage signals from which the current measurement offset error magnitude and phase may be extracted, as described later.

Figure 3:
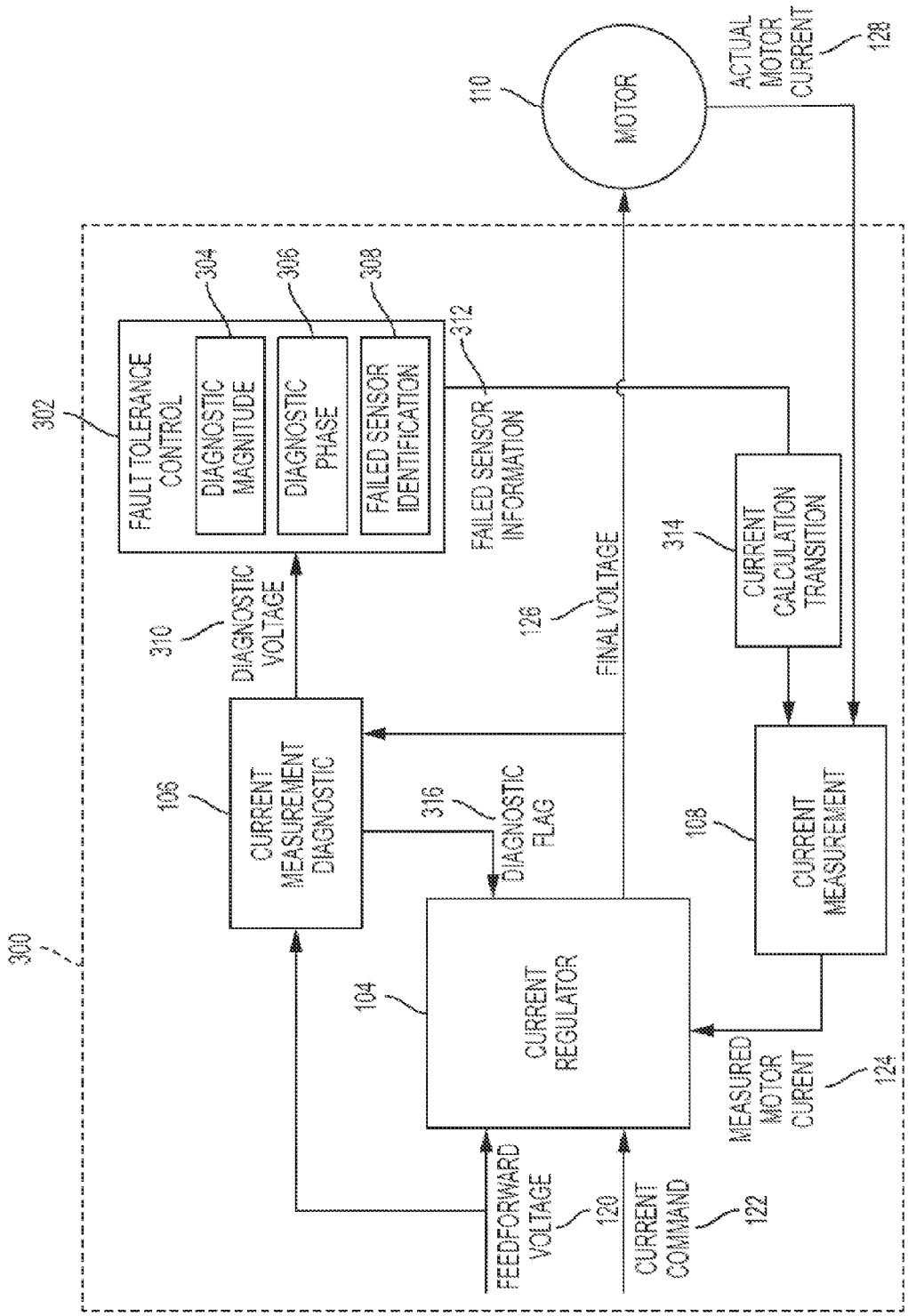
FIG. 3 illustrates a system for determining current sensor failure and transitioning a motor control mode in accordance with some embodiments.

FIG. 3 illustrates a diagnostic scheme in accordance with some embodiments. In these embodiments, a torque control module 300 includes a diagnostic magnitude and phase analysis module 302 to analyze the magnitude and phase of the current measurement offset error based on diagnostic voltage signals. As illustrated above in the calculations of FIG. 1, the error magnitude is the same irrespective of the specific shunt.

The diagnostic magnitude and phase analysis module 302 may be partitioned into further modules or submodules. For example, a diagnostic magnitude computation module 304 may determine a magnitude of a diagnostic voltage 310 as described in more detail below. Additionally, a diagnostic phase evaluation module 306 may determine a phase value based on the diagnostic voltage 310. As described in more detail below, a plurality of threshold values may be calculated; the phase value may only be calculated when the magnitude exceeds a threshold. Further, a failed sensor identification module 308 may identify a specific failed sensor based on the magnitude and phase values, and output suitable notification flags to a control mode transition module 314 or other suitable module configured to adjust or control how the measured motor current 124 is determined if a failed sensor is identified.

The fault tolerance control module 302, specifically the failed sensor identification sub-module 308, detects a specific sensor that has failed based on the magnitude $\Delta I_0$ and phase $\phi$ of the diagnostic voltage 310 computed by the diagnostic magnitude computation module 304 and diagnostic phase calculation module 306 respectively. The magnitude computation module 304 may calculate the magnitude as follows, $$\Delta I_e = \frac{3}{2} \frac{\sqrt{\Delta V_\alpha^2 + \Delta V_\beta^2}}{R}$$

The phase evaluation module 306 may calculate phase as follows:

$$\phi = \tan^{-1}\left(\frac{\Delta V_\beta}{\Delta V_\alpha}\right)$$

As can be appreciated, in the diagnostic scheme of FIG. 3, the magnitude is first evaluated, and if it is larger than a calibratable threshold $\Delta I_{th}$, the phase is calculated (alternatively the phase could be calculated perpetually but used only when the magnitude exceeds a threshold). The magnitude may be compared to a second (e.g. critical) threshold $\Delta I_{thc}$ whose value is higher than $\Delta I_{th}$ to indicate whether multiple simultaneous sensor failures have occurred, in which case the diagnostic scheme could send out a shutdown (or loss of assist mitigation) flag. However, a large enough resistance estimation error may also cause $\Delta I_e$ to become either lower than $\Delta I_{th}$ or higher than $\Delta I_{thc}$, resulting in no detection or false detection respectively. This may be overcome by making the thresholds $\Delta I_{th}$ and $\Delta I_{thc}$ dynamic values that change with an indicator that indicates the "amount" of parameter error. Such an indicator may be obtained, for instance, from the $\Delta V_{dq}$ values after filtering with a programmable low-pass filter, since any average content implies presence of an offset error. Note that such large estimation errors do not typically occur in properly tuned systems, and therefore a detailed discussion of this scheme is not included here.

It is noted that a number of values related to the voltage differences discussed above may be used as the diagnostic voltage. The diagnostic voltage may be calculated as or based on a difference between currents, and/or the diagnostic voltage may be calculated as or based on a difference between voltages. For example, the diagnostic voltage can be $\Delta I_0$, $\Delta I_e$, or $\sqrt{\Delta V_\alpha^2 + \Delta V_\beta^2}$.

The value of the phase may be equal to one of 0, $-\phi_x$, or $\phi_x$, depending on whether the offset error is in phase a, b or c respectively. However, for improved robustness (required due to bandwidth limitations of current regulators), a small detection window of $\phi_w$ is built around the nominal phase values for each of the errors, and the calculated phase is checked to see if it lies within the detection window of a specific shunt. If the value is not within any of the windows, it implies multiple simultaneous failures, and the diagnostic scheme sends out a shutdown (or loss of assist mitigation) flag.

The phase calculations may be summarized as follows:

$$F_s = \begin{cases} a, & -\phi_w \le \phi \le \phi_w \\ b, & -\phi_x - \phi_w \le \phi \le -\phi_x + \phi_w \\ c, & \phi_x - \phi_w \le \phi \le \phi_x + \phi_w \\ m, & \text{else} \end{cases}$$

$F_s$ represents the sensor that has failed and m implies multiple simultaneous sensor failures. Note that the phase detection mechanism may be configured for negative electromechanical polarity systems by simply exchanging the logic for phases b and c.

The error phase is evaluated once the magnitude exceeds the threshold to determine which sensor has failed, and identification and other information regarding the specific sensor(s) that have failed may be sent to current calculation transition module 314 via a failed sensor information signal 312. Once the failed sensor has been detected, the current measurement is modified by the current calculation transition module 314 to use the remaining healthy sensors, and the system is able to operate in feedback control mode. Note that once this scheme is activated as indicated by a flag, it is disabled permanently, and the original diagnostic scheme is enabled. This is done to ensure that if another failure occurs, the system is transitioned to either shutdown or loss of assist mitigation (feedforward control mode) state. Feedforward control operation may be initialized by providing the diagnostic flag 216 directly to the current regulator and/or reference generation module such that the final voltages are computed appropriately.

Figure 4:
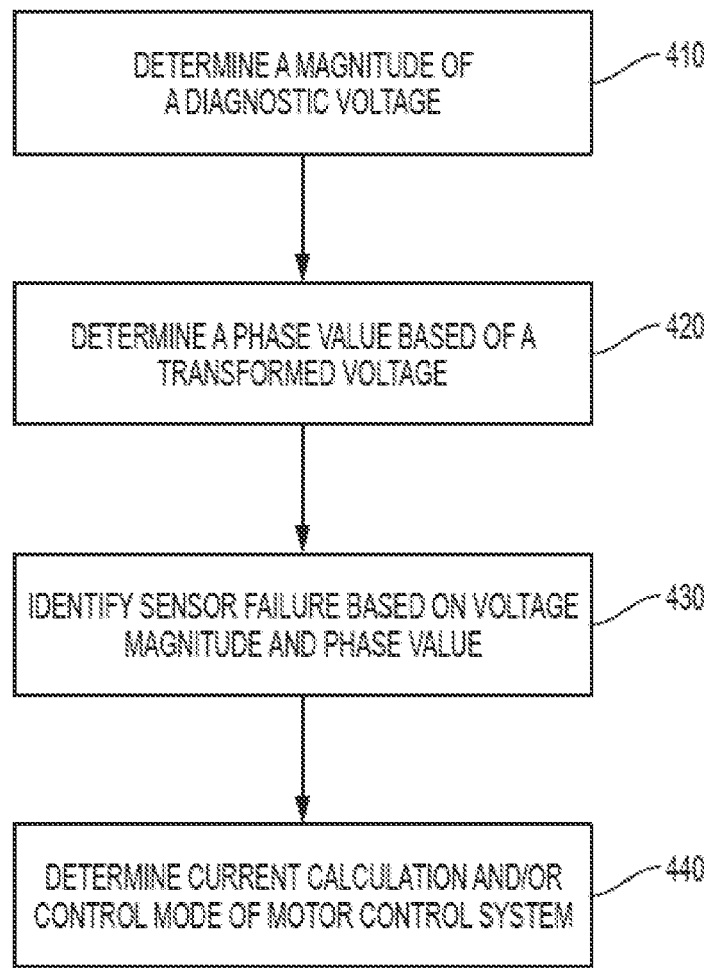
FIG. 4 illustrates a method of determining a current sensor failure and transitioning a motor control mode in accordance with one embodiment.

FIG. 4 is a flow diagram for a control method that can be performed by the torque control module 100 (FIG. 1) in accordance with some embodiments of the invention.

As can be appreciated in light of the disclosure, the order of operation within the method is not limited to the sequential execution as illustrated in FIG. 4, but may be performed in one or more varying orders as applicable and in accordance with the present disclosure.

At block 410, the torque control module 100 determine a magnitude of a diagnostic voltage. In some embodiments, diagnostic voltage can be represented in a stator reference frame.

At block 420, a phase value is determined based on a diagnostic voltage. The magnitude of the diagnostic voltage may be compared to a threshold value to determine whether the phase value should be determined.

At block 430, a specific failed sensor may be identified based on the phase value as discussed above.

At block 440, the current calculation is changed to exclude use of the failed sensor and use the healthy sensors based on the failed sensor information signal. Further, simultaneous sensor failures may be result in a control mode transition such as system shutdown or feedforward control operation as indicated by a diagnostic flag in some embodiments.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for determining a sensor failure in a motor control system with at least three phase current measurements, the system comprising:
   a magnitude computation module that determines a magnitude of a diagnostic voltage, the diagnostic voltage represented in a stator frame and based on a difference between an input voltage command and a final voltage command;
   a phase evaluation module that determines a phase value of the diagnostic voltage based on the diagnostic voltage;
   a sensor failure identification module that identifies a current sensor failure based on the phase value of the diagnostic voltage, the sensor failure represented by a failure signal; and
   a current calculation transition module that modifies a calculation scheme for determining a measurement of motor current based on the sensor failure.

2. The system of claim 1, wherein the failure signal includes failed sensor information configured as a matrix to represent one or more of multiple phase failures.

3. The system of claim 1, wherein the phase evaluation module is configured to determine the phase value based on the magnitude exceeding a threshold value.

4. The system of claim 3, wherein the threshold value is a calibratable threshold based on the magnitude of the diagnostic voltage.

5. The system of claim 1, wherein the magnitude of a current measurement offset error related to the diagnostic voltage is calculated based on:

$$\Delta I_e = \frac{3}{2}\frac{\sqrt{\Delta V_\alpha^2 + \Delta V_\beta^2}}{R},$$

wherein $\Delta V_\alpha$ and $\Delta V_\beta$ represent diagnostic voltages in a stationary reference frame, and R represents a resistance.

6. The system of claim 1, wherein the phase value is calculated based on:

$$\phi = \tan^{-1}\left(\frac{\Delta V_\beta}{\Delta V_\alpha}\right),$$

wherein $\Delta V_\alpha$ and $\Delta V_\beta$ represent diagnostic voltages in a stationary reference frame.

7. The system of claim 1, wherein the phase evaluation module calculates a detection window value from nominal phase values, wherein a first sensor failure is determined by the phase value falling between a negative detection window value and a positive detection window value.

8. The system of claim 7, wherein a second sensor failure is determined by the phase value falling between the detection window value being subtracted from a non-zero phase error value and the detection window being added to the non-zero phase error value.

9. The system of claim 1, wherein the input voltage command is a feedforward voltage command generated by a reference generator based on a torque command, and the final voltage command is configured to be sent to a motor and is based on a measurement of motor current.

10. A method for determining a sensor failure in a motor control system with at least three phase current measurements, the method comprising:
    determining a magnitude of a diagnostic voltage by a magnitude computation module, the diagnostic voltage represented in a stator frame and based on a difference between an input voltage command and a final voltage command;
    determining, by a phase evaluation module, a phase value of the diagnostic voltage based on the diagnostic voltage;
    identifying a sensor failure based on the phase value of the diagnostic voltage by a sensor failure identification module, the sensor failure represented by a failed sensor information signal; and
    modifying a calculation scheme for determining a measurement of motor current based on the sensor failure.

11. The method of claim 10, wherein the failure signal includes failed sensor information configured as a matrix to represent one or more of multiple phase failures.

12. The method of claim 10, wherein the phase evaluation module is configured to determine the phase value based on the magnitude exceeding a threshold value.

13. The method of claim 12, wherein the threshold value is a calibratable threshold based on the magnitude of the diagnostic voltage.

14. The method of claim 10, wherein the magnitude of a current measurement offset error related to the diagnostic voltage is calculated based on:

$$\Delta I_e = \frac{3}{2} \frac{\sqrt{\Delta V_\alpha^2 + \Delta V_\beta^2}}{R},$$

wherein $\Delta V_\alpha$ and $\Delta V_\beta$ represent diagnostic voltages in a stationary reference frame, and R represents a resistance.

15. The method of claim 10, wherein the phase value is calculated based on:

$$\phi = \tan^{-1}\left(\frac{\Delta V_\beta}{\Delta V_\alpha}\right),$$

wherein $\Delta V_\alpha$ and $\Delta V_\beta$ represent diagnostic voltages in a stationary reference frame.

16. The method of claim 10, wherein the phase evaluation module calculates a detection window value from nominal phase values, wherein a first sensor failure is determined by the phase value falling between a negative detection window value and a positive detection window value.

17. The method of claim 16, wherein a second sensor failure is determined by the phase value falling between the detection window value being subtracted from a non-zero phase error value and the detection window being added to the non-zero phase error value.

18. The method of claim 10, wherein the input voltage command is a feedforward voltage command generated by a reference generator based on a torque command, and the final voltage command is configured to be sent to a motor and is based on a measurement of motor current.

* * * * *